April 16, 1946.  A. M. KING  2,398,710
CONTROL MEANS FOR AIRCRAFT
Filed Oct. 6, 1944  3 Sheets-Sheet 1

Inventor

Arthur M. King

By Clarence A. O'Brien
and Harvey B. Jacobson
Attorneys

April 16, 1946. A. M. KING 2,398,710
CONTROL MEANS FOR AIRCRAFT
Filed Oct. 6, 1944 3 Sheets-Sheet 2

Inventor
Arthur M. King
By Clarence A. O'Brien
and Harvey B. Jacobson
Attorneys

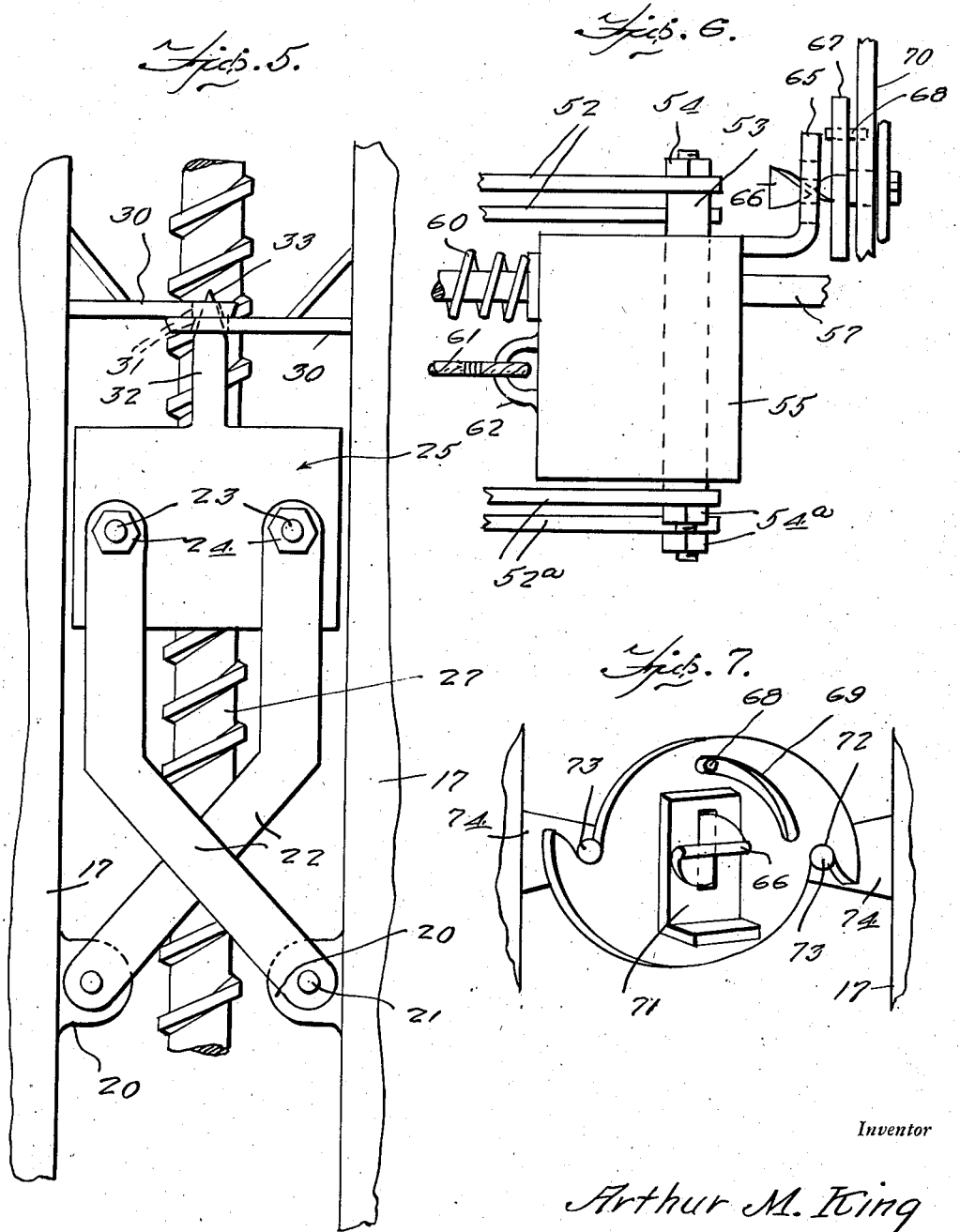

Patented Apr. 16, 1946

2,398,710

UNITED STATES PATENT OFFICE 2,398,710

CONTROL MEANS FOR AIRCRAFT

Arthur M. King, Phoenix, Ariz.

Application October 6, 1944, Serial No. 557,463

3 Claims. (Cl. 244—113)

This invention relates to control means for aircraft, and more particularly to an improved separable control surface for aircraft adapted to effect a reduction of speed in the aircraft, serving as a brake.

A primary object of this invention is the provision of an improved rudder, having separable portions associated therewith, whereby to increase the drag of a plane in passage through the air, and correspondingly reduce its speed.

A further important object is the provision of such a rudder which will, at reduced speed of the plane, act to effect an increased turn of the plane, with a reduced movement of the rudder control.

Still another object of this invention is the provision of improved means for effecting the separation of the separable portions of the rudder, controllable from a remote point in the plane.

A further and more specific object is the provision of improved locking means for holding the separable portions of the rudder in assembled relation, in the use of the device when the brake is not desired.

Still another object is the provision of improved means for effecting the separation of separable portions of any control surface of an airplane, such as the elevators, or the ailerons, or diving flaps or the like.

Still another object resides in the provision of a device of this character which will be sturdy and durable in construction, reliable and efficient in operation, and relatively simple and inexpensive to manufacture and install, for application to conventional airplanes.

Still other objects reside in the combinations of elements, arrangements of parts, and features of construction, all as will be more fully pointed out hereinafter and disclosed in the accompanying drawings, wherein there are shown preferred embodiments of this inventive concept.

Having reference now to the drawings:

Figure 5 is a top plan view showing a fragment of the mechanism disclosed in Figures 2 and 4, in a different position of adjustment.

Figure 6 is a view similar to Figure 4, showing a modified form of construction, and Figure 7 is a fragmentary perspective view showing portions of the operating mechanism disclosed in Figure 6.

Like reference numerals refer to like parts throughout the several views of the drawings.

Figure 1:
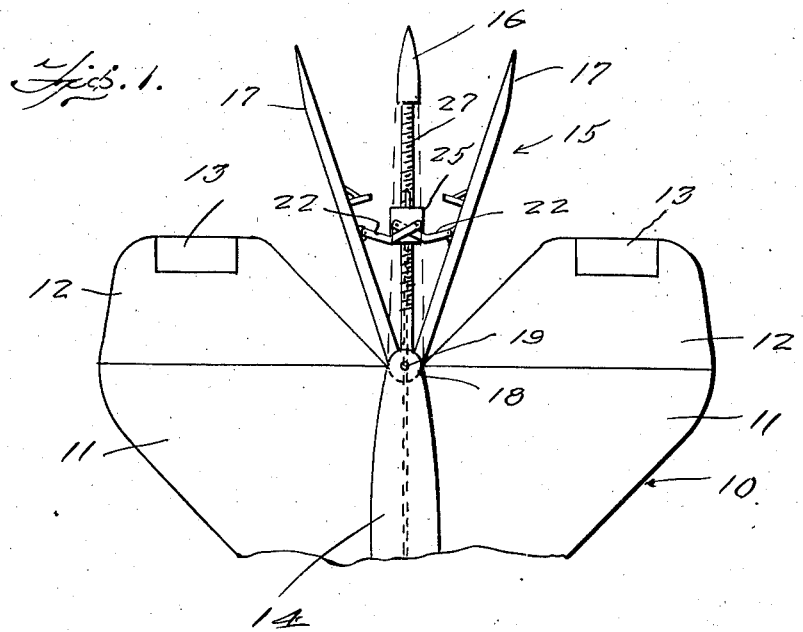
Figure 1 is a top plan view of a fragment of the tail assembly of an airplane, provided with one form of device embodying features of this invention, shown in open position, certain concealed portions of the mechanism being shown in dotted lines.

Having reference now to the drawings, and more particularly to Figure 1, there is generally indicated at 10 a portion of the tail assembly of an airplane, comprised of horizontal stabilizers 11, elevators 12 provided with trim tabs 13, a vertical stabilizer 14, and a rudder generally indicated at 15. Rudder 15 is comprised of a supporting frame 16 and two separable outer members 17, so arranged that when the members 17 are closed adjacent the members 16, the rudder assembly forms a streamlined unit aligned behind the vertical stabilizer 14, adapted to be controlled in any desired manner by conventional controls extending from control members in the pilot's cockpit.

Figure 4:
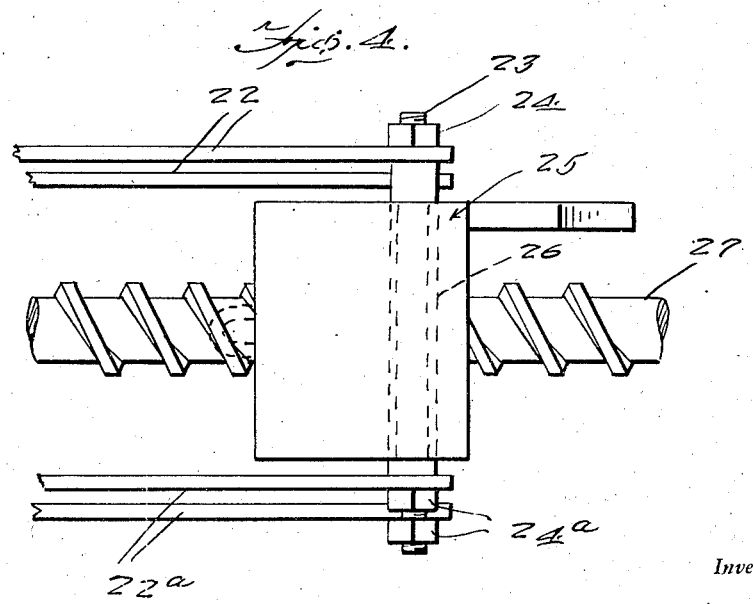
Figure 4 is an enlarged side elevational view of certain portions of the operating mechanism.

The separable members 17 are mounted, as on plates 18, adapted for rotation, or pivotal movement, about a rudder post 19. Secured to the inner side of each of members 17 is a lug 20, to which is secured in pivotal relation, as by a pivot pin 21, one end of a bell crank member 22, the opposite end of which is mounted on and secured to a squared end of a bolt or pin 23, being held in position, as by a nut 24, bolt 23 being secured within suitable bores or sleeves in a block generally indicated at 25. As best shown in Figure 4, the opposite ends of bolt 23 extend completely through the block 25, and have secured to their extremities, as by means of nuts 24a, bell crank members 22a similar to and aligned with members 22, and secured to corresponding lugs below and aligned with lugs 20 on separable members 17.

Block 25 is provided with a threaded bore 26 extending horizontally therethrough (see Fig. 3), within which is positioned for rotation a threaded shaft or rod 27. One end of rod 27 is journaled in the outer extremity of rudder frame 16, and the other end passes into the interior of the plane fuselage, wherein is positioned any desired source of power, such as an electric motor (not shown) adapted to rotate the rod when suitably energized.

Figures 2, 3:
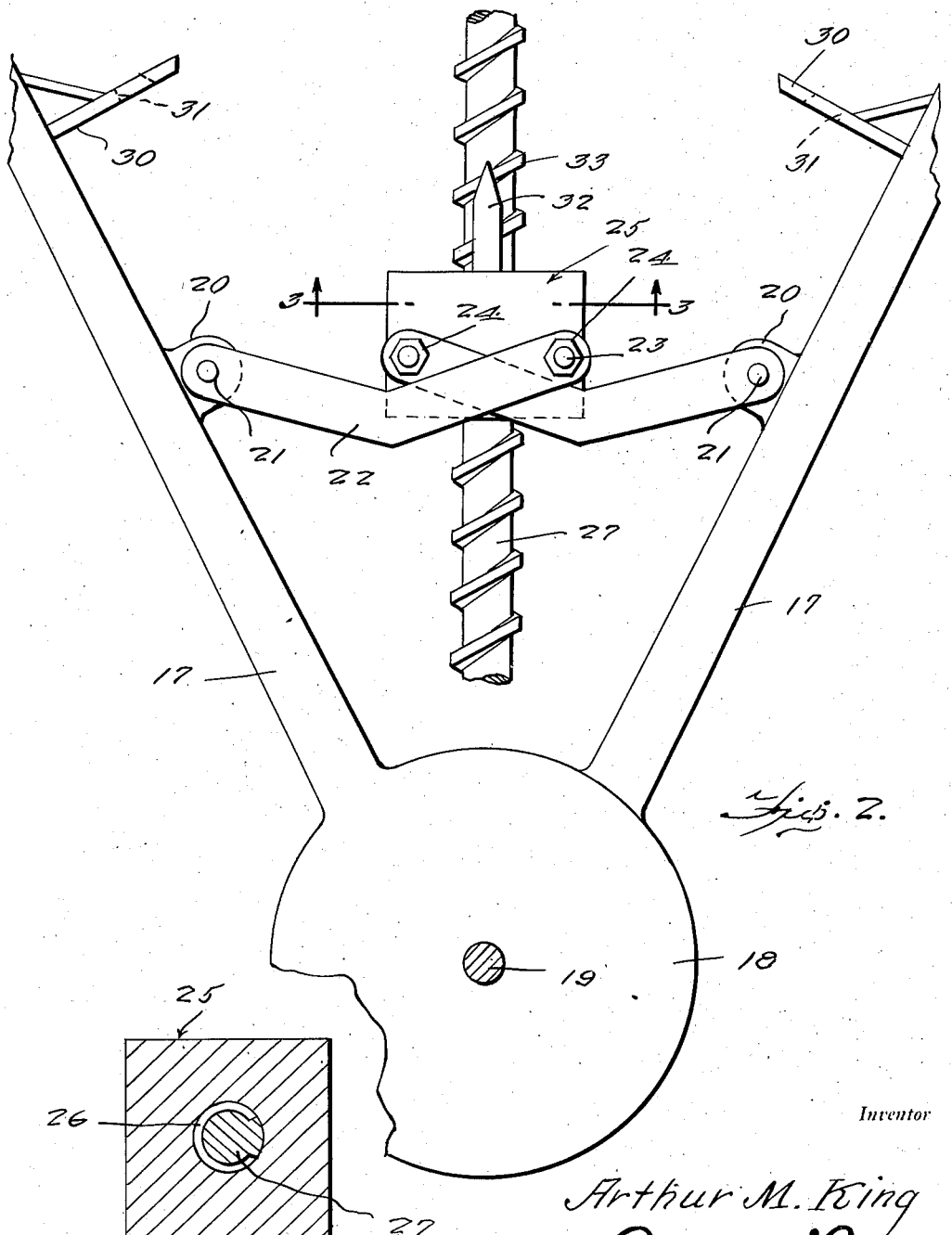
Figure 2 is an enlarged fragmentary top plan view of portions of the mechanism shown in Figure 1.
Figure 3 is a sectional view taken substantially along the line 3—3 of Figure 2, as viewed in the direction indicated by the arrows.

From the foregoing it will now be seen that when it is desired to separate the separable portions 17 of the rudder, in order to effect a braking action on the speed of the plane, it is merely necessary to rotate the rod 27, which rotation causes movement of the block 25 and its associated bell crank members 22 from the position shown in Figure 5 to the position shown in Figure 2, or any intermediate point therebetween, thus effecting a separation of the members 17, which serve to increase the drag of the plane, creating a partial vacuum between the extremities thereof and accordingly slowing down the plane.

Means are also provided for locking the separable portions in closed position when it is desired to use the rudder in a conventional manner. Such means take the form of projections 30 extending from the interior surfaces of members 17, and provided with apertures 31, which apertures are adapted to be engaged by a pin 32 provided with a wedge-shaped point 33 secured to block 25. As the block 25 is drawn forwardly toward the fuselage of the plane, the wedge-shaped point 33 disengages the apertures 31 simultaneously with the concurrent separation of members 17 effected by bell crank levers 22. Conversely, as the members 17 are closed toward the frame 16, the members 30 are brought inwardly until the apertures 31 are in registering alignment adjacent point 33 of the pin 32, which, as the block 25 moves forwardly, is adapted to engage the same and securely hold the parts in closed position.

From the foregoing it will now be seen that with the members 17 in spread or partially spread position, a maximum control over the direction of flight of the aircraft may be achieved with a minimum movement of the rudder, due to the fact that either of members 17 has a distance to travel, in order to achieve full right or left rudder position, of approximately half that of the path of travel of the normal rudder, and that when such movement of one of the members either to the right or left is achieved, the other of members 17 is positioned out of the slip stream behind the vertical stabilizer, in such manner that the entire ruddering effect is accomplished by the other of the members 17. Thus, it will be seen that a maximum flexibility of controls assure to the aircraft a low speed with a minimum movement of the rudder controls.

Various means may be employed for effecting the separation of separable members 17, as well as various means for locking the portions in assembled inoperative position. An alternative form of means for moving the separable portions is disclosed in Figure 6, and takes the form of a block 55 having a bore therethrough, which, however, is smooth instead of threaded, as is bore 26, through which is adapted to be passed a smooth rod or shaft 57. Vertical bores accommodate pins 53 provided with nuts 54 adapted to secure bell crank levers 52 substantially identical to bell crank levers 22. Similarly, the opposite ends of pins 23 are provided with nuts 54a adapted to hold in position bell crank levers 52a similar to the levers 22a. A relatively heavy compression spring 60 surrounds rod 57 on the interior side thereof, and abuts block 55, and the movement of the block 55 is effected by a control cord or cable 61 secured to an eye 62 on the inner side of the block, a pull on the cable effecting movement of the block in a direction to separate the separable members 17, and the resiliency of the spring 60 serving to force the block, and correspondingly the members 17, back into closed position when the force on cable 61 is released.

An alternative form of lock construction is also shown in Figures 6 and 7, and takes the form of an upwardly extending lug 65 having a transverse slot therethrough, secured to the upper portion of block 55, in which slot is positioned a twisted sheet metal plate 66. Plate 66 has secured thereto a plate 67 provided with a pin 68 adapted to engage in an arcuate slot 69 in a cam member 70. The opposite end of twisted member 66 extends through a slot in a plate 71 associated with member 70, whereby linear movement of the block 55 and lug 65 is transmitted to rotary movement of plate 67 and hence pin 68 which, through its engagement with slots 69 moves cam member 70. The cam member 70 is provided with two depressions 72, adapted to engage transversely extending pins 73 carried by lug 74 similar in position to members 30 in the foregoing modification. Thus, it will be seen that as the block 55 is moved toward the tail of the plane in such manner as to close the separable portions 17, the cam member 70 is rotated until depressions or grooves 72 engage pins 73, whereupon the separable members 17 are held securely against separation.

Obviously, various other modes of operation for the movement of the block adapted to separate the separable members may be utilized if desired, as, for example, hydraulic means effecting movement of the block through a rack and pinion, or other known mechanical movements.

Equally obviously, while the device has been herein described as associated with the rudder of a plane, it will be understood that the mechanism for separating the separable parts of the device may be equally well associated with diving flaps, elevators, or other control surfaces of the plane.

Now, from the foregoing it will be seen that there is herein provided a mechanism accomplishing all the objects of this invention and others, including many advantages of great practical utility and commercial importance.

As many embodiments may be made of this inventive concept, and as many modifications may be made in the embodiments hereinbefore shown and described, it is to be understood that all matter herein is to be interpreted merely as illustrative and not in a limiting sense.

I claim:

1. In a rudder for aircraft, in combination, a frame, two separable rudder surfaces pivotally secured to said frame, and means for separating and closing said surfaces, said means including a movable block, link members pivotally secured to said block and said surfaces, a threaded rod engageable in a threaded bore rotatable to move said block, and means including a pin carried by said block for locking said surfaces in closed position.

2. In a rudder for aircraft, in combination, a frame, two separable rudder surfaces pivotally secured to said frame, means for separating and closing said surfaces, and means for locking said surfaces in closed position, said means including a movable block, lugs having apertures therein associated with said surfaces, and a pin on said block engageable in said apertures.

3. In a control surface for aircraft, a frame, two separable control surfaces pivotally secured to said frame, means for separating and closing said surfaces, said means including a movable block, link members pivotally secured to said block and said surfaces, means for moving said block, and means for locking said surfaces in closed position, said means including lugs having apertures therein associated with said surfaces, and a pin on said block engageable in said apertures.

ARTHUR M. KING.